United States Patent Office 3,297,724
Patented Jan. 10, 1967

---

3,297,724
DIEPOXIDES
Richard L. McConnell and Harry W. Coover, Jr., Kingsport, Tenn., assignors to Eastman Kodak Company, Rochester, N.Y., a corporation of New Jersey
No Drawing. Filed Mar. 7, 1961, Ser. No. 93,867
5 Claims. (Cl. 260—348)

This invention relates to the preparation of diepoxides and more particularly to the preparation of diepoxides from the diallyl ethers of saturated hydrocarbon glycols in which the hydroxy groups are separated by more than two carbon atoms including 2,2-dimethyl-1,3-propanediol (neopentyl glycol), 2,2,4-trimethyl-1,3-pentanediol, cis- or trans-1,3-cyclohexanedimethanol, cis- or trans-1,4-cyclohexanedimethanol, 2,2,4,4-tetramethyl-1,3-cyclobutanediol and 2,5-(or 6-) norcamphanedimethanol.

The epoxidation of various organic compounds is old and well-known in the art as well as the various epoxidizing agents employed for carrying out the reaction. For example, it is well known that simple unsaturated organic compounds such as butadiene, vinylcyclohexene, dicyclopentadiene and others can be epoxidized to yield diepoxide compounds. Also, aromatic bisglycidyl ethers of hydroquinone, resorcinol and Bisphenol A (4,4'-isopropylidenediphenol) can be prepared by treating aromatic-hydroxy compounds with epichlorohydrin. A typical example of such a compound derived from Bisphenol A has the structure:

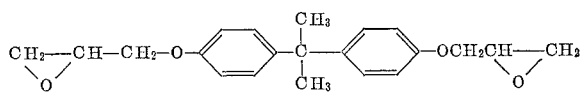

Among the aliphatic-type glycols, the bisglycidyl ether of ethylene glycol may be prepared by treatment of ethylene glycol with epichlorohydrin in the presence of a stannic chloride catalyst followed by dehydrohalogenation with 50% sodium hydroxide solution.

In U.S. Patent 2,643,239, the preparation of bisglycidyl ethers of polyethers by treatment of dihydric phenols with epichlorohydrin in the presence of a strong base such as sodium or potassium hydroxide followed by heating for several hours to effect the polymerization is disclosed. These polyethers are thus polymeric products derived from bisphenols such as Bisphenol A. In addition, the preparation of mixed allyl glycidyl ethers by treatment of Bisphenol A with allyl chloride in the presence of sodium hydroxide followed by treatment of the intermediate monoallyl ether with epichlorohydrin in the presence of sodium hydroxide is disclosed in U.S. Patent 2,464,753.

Bisglycidyl ethers such as those referred to in the above-mentioned prior art have been used for the preparation of epoxy resins and have proved to have some usefulness as heat stabilizers for halogen-containing resins such as poly(vinyl chloride). However, many of these prior art products are deficient in certain of the preferred or necessary properties for the production of good epoxy resins and as stabilizers. For example, they have poor compatibility with certain resins such as poly(vinyl chloride) and with polyesters, polyethers and polyolefins. Many of these prior art epoxy resins are also extremely brittle. In addition to these disadvantages, long curing times and high curing temperatures are required. In contrast to these deficiencies, the compounds of the present invention display a high degree of compatibility with a wide range of polymeric materials. This makes them extremely useful, not only for the production of valuable epoxy resins having especially good physical properties such as toughness, flexibility and good color, but also renders them useful as stabilizers for many commercial polymeric products.

This invention has as its principal object to prepare new diepoxides which are bisglycidyl ethers of certain aliphatic glycols and certain cycloaliphatic glycols which have particular usefulness in the production of epoxy resins.

Another object is to provide new raw materials for the production of epoxy resins having particularly good physical properties such as toughness, clarity, flexibility and compatibility with other resins.

Another object is to prepare new types of diepoxides from diallyl ethers of saturated hydrocarbon glycols in which the hydroxy groups are separated by more than two carbon atoms, which diepoxides may readily be polymerized in the presence of typical acidic or basic curing agents to give epoxy resins having excellent physical properties such as toughness and flexibility.

Another and specific object is to provide new compositions of matter which are modified polyether resins.

Other objects will appear hereinafter.

These objects are accomplished by the following invention, according to one embodiment thereof, which involves treating the diallyl ethers of saturated hydrocarbon glycols in which the hydroxy groups are separated by more than two carbon atoms with peracetic acid. The required diallyl ethers are readily prepared by treatment of the glycols in question with allyl alcohol in the presence of mercuric acetate and boron trifluoride etherate, as disclosed in the copending application of Richard L. McConnell and Harry W. Coover, Jr., Serial No. 93,838, filed March 7, 1961. The reaction for the preparation of these diallyl ethers is illustrated in the following equation:

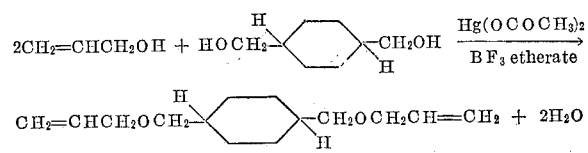

Water is liberated during the course of the etherification reaction and may be conveniently removed by employing benzene or other suitable solvents for azeotroping out the water from the reaction mixture. Reactions are conducted until the theoretical amount of water has been removed.

As indicated above, in practicing the invention diallyl ethers of saturated hydrocarbon glycols in which the hydroxy groups are separated by more than two carbon atoms are epoxidized by treatment with an epoxidizing agent such as peracetic acid, hydrogen peroxide, performic acid and hypochlorous acid. In the case of hypochlorous acid, the intermediate chlorohydrin must be reacted with a base in order to produce the epoxide group such as sodium hydroxide or potassium hydroxide. The preparation of the diepoxides of our invention may thus be illustrated by the following equations showing the preparation of 1,4-bis(2,3-epoxypropoxymethyl)cyclohexane from the diallyl ether of 1,4-cyclohexanedimethanol.

(1)

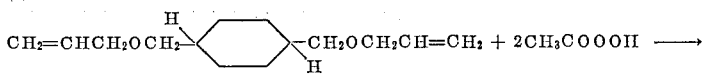

diallyl ether of 1,4-cyclohexanedimethanol

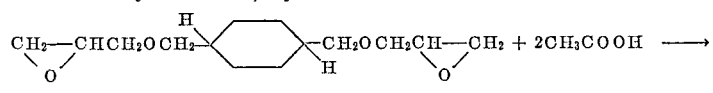

1,4-bis(2,3-epoxypropoxymethyl)cyclohexane (2)

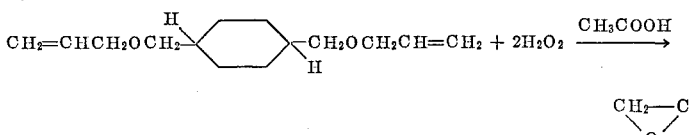

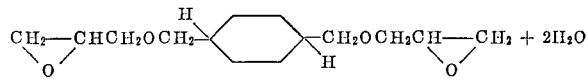

(3)

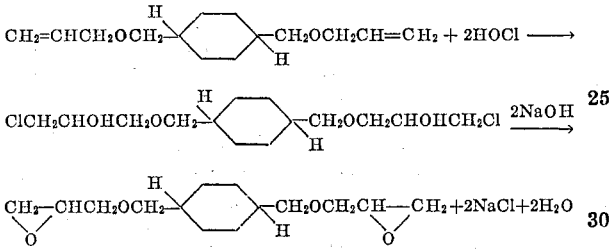

The preparation of diepoxides, in accordance with the invention, from a noncyclic glycol is illustrated by the following equation:

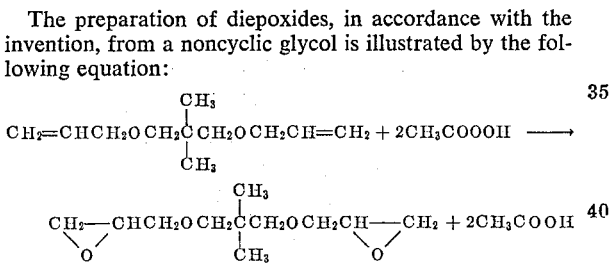

In the following examples and description, we have set forth several of the preferred embodiments of our invention, but they are included merely for purposes of illustration and not as a limitation thereof.

EXAMPLE 1.—PREPARATION OF 1,4-BIS(2,3-EPOXYPROPOXYMETHYL)CYCLOHEXANE

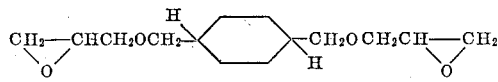

1,4-bis(allyloxymethyl)cyclohexane (0.5 mole) and sodium acetate (0.5 mole) were placed in 300 ml. of chloroform and stirred while peracetic acid (1.2 moles) (40% peracetic acid in acetic acid) was added dropwise. The reaction was exothermic and the temperature rose to about 60° C. Then the reaction mixture was stirred for four hours at 25° C. After diluting the reaction mixture with water, it was extracted with diethyl ether. The ether solution was washed with saturated sodium thiosulfate solution and then again with water. After drying the organic solution over sodium sulfate, the solvents were removed by distillation at atmospheric pressure. Finally, the product was stripped in vacuo (1 mm.) leaving the product as a transparent viscous oil. The oxirane oxygen content of this compound was 11.4%.

EXAMPLE 2.—PREPARATION OF 1,3-BIS(2,3-EPOXYPROPOXY)-2,2-DIMETHYLPROPANE

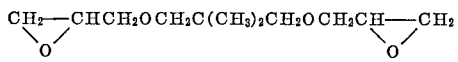

This viscous oil was prepared from 1,3-bis(allyloxy)2,2-dimethylpropane and peracetic acid according to the procedure of Example 1. The oxirane oxygen content of this compound was 13.5%.

EXAMPLE 3.—PREPARATION OF 1,3-BIS(2,3-EPOXYPROPOXY)2,2,4,4 - TETRAMETHYLCYCLOBUTANE

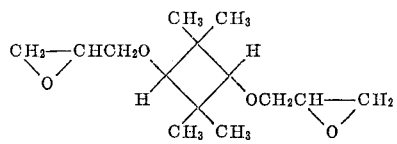

This compound was prepared from 1,3-diallyloxy-2,2,4,4-tetramethylcyclobutane and peracetic acid according to the procedure of Example 1. The oxirane oxygen content of this compound was 10.9%.

EXAMPLE 4.—PREPARATION OF 1,3 - BIS(2,3-EPOXYPROPOXY)-2,2,4-TRIMETHYLPENTANE

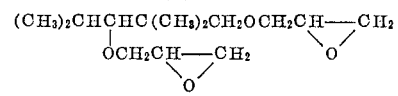

This compound was prepared from 1,3-diallyloxy-2,2,4-trimethylpentane and peracetic acid according to the procedure of Example 1. The oxirane oxygen content of this compound was 10.2%.

EXAMPLE 5.—PREPARATION OF 2,5- (OR 6-)BIS(2,3-EPOXYPROPOXYMETHYL)NORCAMPHANE

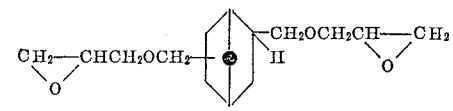

This viscous transparent oil was prepared from 2,5- (or 6-)bis(allyloxymethyl)norcamphane and peracetic acid according to the procedure of Example 1. The oxirane oxygen content of this compound was 10.3%.

EXAMPLE 6.—PREPARATION OF 1,4 - BIS(2,3-EPOXY - 2-METHYLPROPOXYMETHYL)CYCLOHEXANE

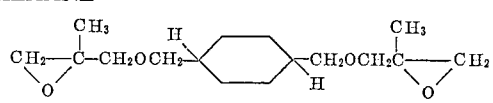

This compound was prepared from 1,4-bis(methallyloxymethyl)cyclohexane and peracetic acid according to the procedure of Example 1. The oxirane oxygen content of this compound was 9.6%.

EXAMPLE 7.—PREPARATION OF EPOXY RESINS DERIVED FROM 1,4 - BIS(2,3-EPOXYPROPOXYMETHYL)CYCLOHEXANE 1,4-bis(2,3-epoxypropoxymethyl)cyclohexane (6.4 g.) and adipic acid (1.8 g.) were mixed with stirring and heated at 125° C. for 3 hr. to produce a colorless transparent resin which is extremely hard and tough. A similar resin was obtained by treating 1,4-bis (2,3-epoxypropoxymethyl)cyclohexane (6.4 g.) with maleic anhydride (1.7 g.) and neopentyl glycol (0.2 g.) at 125° C. for several hours. This resin is hard and transparent.

This epoxide may also be cured with polyamines. For example, a clear, tough, hard resin was obtained when bis(2,3-epoxypropoxymethyl)cyclohexane (6.4 g.) was treated with diethylenetriamine (1.0 g.) at 125° C. for several hours.

Similar resins were obtained from the compounds described in Examples 2–6.

As indicated in Example 7, the bisglycidyl ethers of the present invention lend themselves readily to the preparation of resins by the use of certain modifying agents. For example, in Example 7 adipic acid has been used to illustrate this action. However, other dibasic acids such as maleic, fumaric, glutaric, succinic, sebacic, isosebacic and suberic acids may be employed. As is well-known, these dibasic acids will modify the polyethers in such a way as to produce resins with particularly preferred properties. In a similar manner, acid anhydrides and glycols may be used to modify the resins. In addition to maleic anhydride and neopentyl glycol which are mentioned in Example 7, other anhydrides such as succinic anhydride and phthalic anhydride and other polyols such as ethylene glycol, trimethylene glycol, tetramethylene glycol, pentamethylene glycol, cyclohexanedimethanol, pentaerythritol, etc., can be used. In addition to diethylenetriamine, other polyamines such as triethylene tetramine, 1,6-hexanediamine, cyclohexanebismethylamine, etc., may be used.

Within the broad scope of our invention and as indicated above, we may treat either allyl ethers or substituted allyl ethers such as the methallyl ethers with peracetic acid to form the diepoxides of the present invention. Therefore, the diepoxy ethers may be either simple unsubstituted glycidyl ethers or methyl-substituted diglycidyl ethers. By the term glycidyl ether, as used herein and in the claims, it is to be understood that we refer to either unsubstituted glycidyl ethers or a substituted type of compound such as a methyl substituted glycidyl ether.

As indicated in the above examples and description, the novel epoxides of this invention are valuable intermediates for the preparation of a wide range of epoxy resins. For example, these new epoxy compounds may be treated with anhydrides, polyhydroxy compounds or polyamines to produce hard, cross-linked resins. These epoxy resin formulations are extremely valuable for coating compositions, potting compositions and casting materials. For example, when employing these resin compositions as coating materials, the compositions which are in liquid form are applied to the surface desired to be coated and cured under the influence of either heat or catalyst or both. Polymerization and cross-linking occur with the result that a hard, infusible and insoluble coating is produced. Similarly, when these resin compositions are applied as potting compositions or as casting materials, the same phenomenon of polymerization and cross-linking takes place to produce the desired hard, infusible material required. The epoxy resin compositions produced from the epoxides of this invention also have excellent adhesive properties, adhering particularly well to surfaces of glass and various metals. This enables them to be employed in the lamination of glass and also in the repair of damaged metal surfaces such as automobile fenders and the like. The resin composition in the latter case is applied in liquid form on the surface to be treated and then permitted to polymerize and cross-link to form a hard, tough wear-resistant surface.

The diepoxides of this invention are also useful as stabilizers for polymeric materials such as cellulose esters. For example, the diepoxides of the present invention when used in concentrations of 0.1 to about 5% in combination with potassium acid oxalate in concentrations of 0.01 to 0.05% in a plasticized cellulose acetate or cellulose acetate butyrate gives a heat stable cellulose ester composition which will maintain an APHA color of less than 50 when heated at 205° C. for 1 hour in a typical heat test. Without the presence of the stabilizers, the cellulose acetate or cellulose acetate butyrate compositions would be dark brown or black after the usual 1-hour heating at 205° C.

In addition to the above indicated uses, the new epoxy compounds of our invention may be employed for the preparation of polyols, aminoalcohols and organophosphorus derivaties. Such uses are illustrated by the following equations:

*Polyols*

(1)
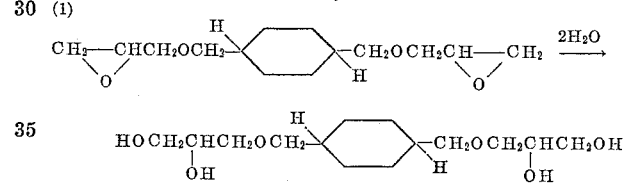

The polyols derived as indicated by this typical equation from the epoxy compounds of our invention are useful in the preparation of epoxy resin formulations, alkyd resin formulations and in the preparation of other typical polyesters.

*Aminoalcohols*

(2)
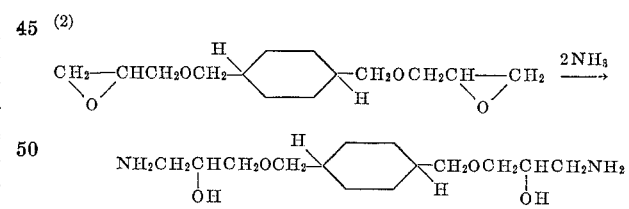

The aminoalcohols derived as above indicated from the epoxy compounds of our invention are useful in the preparation of epoxy resin compositions and in the preparation of a variety of polyamides and polyesters.

*Organophosphorus derivatives*

(3)
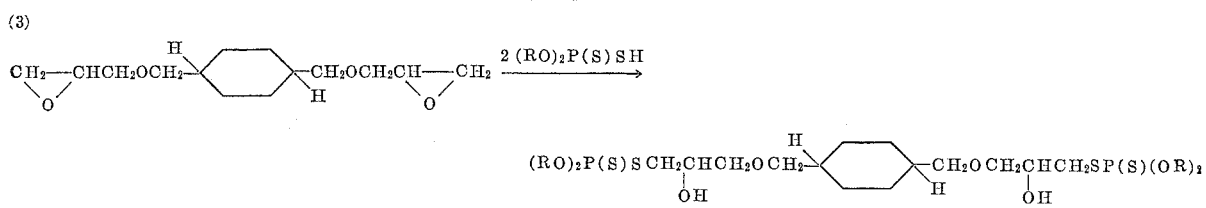

wherein R is an alkyl group such as methyl, ethyl, propyl, isopropyl, butyl, isobutyl, octyl, 2-ethylhexyl, and so forth. Such organophosphorus compounds as typified by the product of the above reaction derived from the epoxy compounds of this invention are valuable as insecticides. The reaction of dialkyl phosphorothiolothionates with epoxy compounds is described in McCall and McConnell U.S. Patents 2,921,086 and 2,895,984.

Although the invention has been described in considerable detail with particular reference to certain preferred embodiments thereof, variations and modifications can be effected within the spirit and scope of the invention as described herein above, and as defined in the appended claims.

We claim:
1. As a new composition of matter, 1,4-bis(2,3-epoxypropoxymethyl)cyclohexane.
2. As a new composition of matter, 1,3-bis(2,3-epoxypropoxy)-2,2,4,4-tetramethylcyclobutane.
3. As a new composition of matter, 1,3-bis(2,3-epoxypropoxy)-2,2,4-trimethyl-1,3-pentanediol.
4. As a new composition of matter, 2,5-bis(2,3-epoxypropoxymethyl)norcamphane.
5. As a new composition of matter, 2,6-bis(2,3-epoxypropoxymethyl)norcamphane.

References Cited by the Examiner

UNITED STATES PATENTS

| | | | |
|---|---|---|---|
| 2,538,072 | 1/1951 | Zech | 260—348.6 |
| 2,581,464 | 1/1952 | Zech | 260—2 |
| 2,898,349 | 8/1959 | Zuppinger | 260—2 |
| 2,962,453 | 11/1960 | Phillips et al. | 260—2 |

OTHER REFERENCES

Lee et al., "Epoxy Resins," McGraw-Hill, 1957, New York, pages 10 and 115–117 relied upon. (TP 986. E6 L4.)

WILLIAM H. SHORT, *Primary Examiner.*

HAROLD BURSTEIN, *Examiner.*

J. J. KLOCKO, W. MUNDLE, S. N. RICE,
*Assistant Examiners.*